(12) United States Patent
Roosta et al.

(10) Patent No.: US 8,750,507 B2
(45) Date of Patent: Jun. 10, 2014

(54) DYNAMIC GROUP CREATION FOR MANAGED KEY SERVERS

(75) Inventors: Tanya Roosta, Saratoga, CA (US); Kavitha Kamarthy, Milpitas, CA (US); Dinesh Ranjit, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 998 days.

(21) Appl. No.: 12/692,812

(22) Filed: Jan. 25, 2010

(65) Prior Publication Data

US 2011/0182426 A1 Jul. 28, 2011

(51) Int. Cl.
*H04K 1/00* (2006.01)
*H04L 29/00* (2006.01)

(52) U.S. Cl.
USPC .......................................... 380/255; 380/279

(58) Field of Classification Search
USPC .................................. 380/279, 255
See application file for complete search history.

(56) References Cited

U.S. PATENT DOCUMENTS

| | | | | |
|---|---|---|---|---|
| 6,223,286 | B1* | 4/2001 | Hashimoto | 713/178 |
| 6,889,328 | B1* | 5/2005 | Sanchez Herrero et al. | 726/3 |
| 7,269,728 | B1* | 9/2007 | Li | 713/163 |
| 2005/0152305 | A1* | 7/2005 | Ji et al. | 370/328 |
| 2005/0238325 | A1* | 10/2005 | Tanabe et al. | 386/95 |
| 2006/0174116 | A1* | 8/2006 | Balfanz et al. | 713/168 |
| 2009/0094367 | A1* | 4/2009 | Song et al. | 709/227 |

OTHER PUBLICATIONS

Studer, Johns, Kase, O'Meara & Cranor. A Survey to Guide Group Key Protocol Development. 2008. IEEE. ACSAC.2008.28. pp. 475-484.*
Hardjono, Cain, Monga. Intra-Domain Group Key Management Protocol. Feb. 2000. Internet Engineering Task Force. pp. 1-32. http://tools.ietf.org/html/draft-ietf-ipsec-intragkm-02#ref-KA98b.*
Baugher, Canetti, Dondeti, Lindholm. Multicast Security (MSEC) Group Key Management Architecture. Apr. 2005. Internet Engineering Task Force. pp. 1-38. http://www.ietf.org/rfc/rfc4046.txt.*
D. Wing, "DTLS-SRTP Key Transport (KTR)," AVT Working Group, Internet Draft, Cisco, Mar. 9, 2009.

* cited by examiner

*Primary Examiner* — Tamara T Kyle
(74) *Attorney, Agent, or Firm* — Edell, Shapiro & Finnan, LLC (57) ABSTRACT

A technique for dynamically creating and deleting groups to support secure group communication sessions is provided herein. A request for creation of a dynamic group that enables group members to participate in a secure group communication session is received by a network authentication device such as a key server. Creation of the dynamic group includes generating a lifetime attribute indicating when the dynamic group is to exist based on timing information provided in the request, along with security policies required for generating the keys, and generating a unique group ID associated with the dynamic group for distribution to the group members. The keys for the secure group communication session are supplied, along with security policies, in response to a request containing the unique group ID identifying the dynamic group. The dynamic group is deleted in response to determining from the lifetime attribute that the secure group communication session has expired.

20 Claims, 5 Drawing Sheets

DYNAMIC GROUP CREATION FOR MANAGED KEY SERVERS

TECHNICAL FIELD

The present disclosure relates to management of secure communications in communication networks.

BACKGROUND

Encryption is used to provide secure communications between entities over communication networks. In the case of communications involving a group of participants, cryptographic keys may be distributed to the group members and employed to encrypt messages or content sent over the network during a communication session. To facilitate secure group communication, a group can be created on a key server that authenticates group members and generates and supplies keys to the members. A group keying protocol, such as the Group Domain of Interpretation (GDOI) protocol, can be used for interactions between the key server and group members.

Currently, a static group created on a key server persists indefinitely or until the group is explicitly cleared on the key server through configuration. The GDOI protocol commonly used for group keying is designed primarily for implementation of such static groups, which are not deleted or terminated at a certain point in time or after a given period of time.

DESCRIPTION OF EXAMPLE EMBODIMENTS

Overview

A technique for dynamically creating and deleting groups to support secure group communication sessions is provided herein. A request for creation of a dynamic group that enables group members to participate in a secure group communication session is received by a network authentication device such as a key server. Creation of the dynamic group includes generating a lifetime attribute indicating when the dynamic group is to exist based on timing information provided in the request, along with security policies required for generating the keys, and generating a unique group identifier (ID) associated with the dynamic group for distribution to the group members. The keys for the secure group communication session are supplied in response to a request containing the unique group ID identifying the dynamic group. The dynamic group is deleted in response to determining from the lifetime attribute that the secure group communication session has expired. The key server can extend the group lifetime in response to a request to extend the secure group communication session.

Example Embodiments

Figure 1:
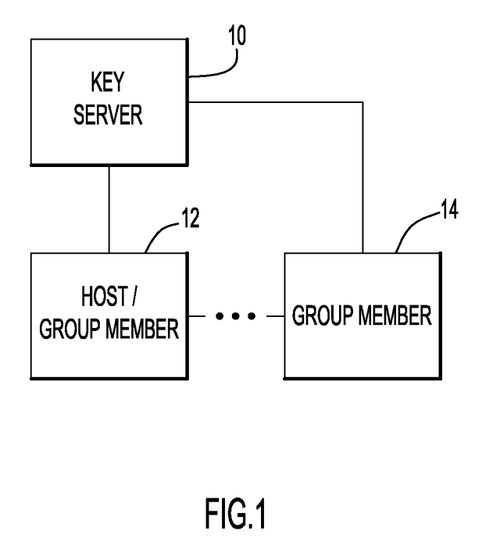
FIG. 1 is a block diagram illustrating an example of a communication network in which a key server is configured to generate a dynamic group to support a secure group communication session among group members.

Referring first to FIG. 1, a simplified network environment is shown in which entities are configured to communicate in secure group communication sessions with the support of a key server 10 capable of dynamically creating and deleting groups. A secure group communication session involves at least two group members 12 and 14 that are participants in the session and which can be any entities capable of communicating over a network with each other in a secure manner using cryptographic keys. For example, the group members can be virtually any type of electronic equipment suitable for transmitting or receiving content for a human user, including but not limited to: data signals, audio/voice signals, video or visual display signals, and any other types of media or content. Any one or combination of network media such as wire, cable, optical fiber, wireless link, satellite, etc. can be used to network the group members. As indicated by the ellipsis between host 12 and group member 14 in FIG. 1, any practical number of group members may belong to the group, depending on the type of application used for the session. The group members may be in physically separate locations and connected via a wide area network (WAN) or the Internet. Likewise, key server 10 may be at a separate site or location from the group members and accessed via a WAN or the like.

As shown in the embodiment in FIG. 1, one of the group members participating in the group communication session can be a session host 12. Host 12 is an entity that initiates a secure group communication session and which may interact either directly or indirectly with key server 10 to request establishment of a dynamic group to support the session.

By way of an example, the group members may communicate via an on-demand application, such as Telepresence, WebEx, or pay-per-view TV, in which users join the session for a given period of time, after which there is no need to maintain the existence of the group. Thus, as used herein, the term secure group communication session includes: video conferencing; network-supported meetings, such as meetings that include a combination of voice and data/video display; and customer access of on-demand or pay-per-view content from a provider (e.g., web-based, satellite, cable, fiber optic delivery, etc.). Another example of a secure group communication session is a temporary subscription to a premium channel or content offered by a provider (e.g., as a result of a promotion), where access to the premium channel/content terminates at some point in time. Thus, group members may be active participants in the session (e.g., an on-line meeting) or passive participants (e.g., listening to a lecture or viewing on-demand content). With an on-demand application, individual group members may be capable of joining and leaving a session throughout the course of the session, provided the group members have been authenticated and have been provided with the cryptographic keys required to participate. Current on-demand applications include a variety of security solutions, which are typically proprietary and implemented at a higher architecture layer such as the application layer. Such solutions do not employ network layer (layer 3) encryption that can be provided by a key server capable of establishing a group.

Key server 10 shown in FIG. 1 is responsible for dynamically creating groups, authenticating group members, and either directly or indirectly supplying to the group members the cryptographic keys and security policies to be used in the secure group communication session. One example of a key-server-based group encryption technology is Group Encrypted Transport Virtual Private Network (GETVPN) offered by Cisco Systems, Inc. GETVPN eliminates the need to create point-to-point Internet Protocol Security (IPSec) tunnels between each entity and uses Group Domain of Interpretation (GDOI) as the group keying protocol and IPSec for encryption, providing network layer encryption. IPSec is a set of protocols for securing Internet Protocol (IP) communications by authenticating and encrypting IP packets of a data stream. IPSec also includes protocols for establishing mutual authentication between agents at the beginning of a session and for negotiating cryptographic keys to be used during the session. IPSec uses the Internet Key Exchange (IKE) protocol to set up a security association by handling negotiation of protocols and algorithms and to generate the encryption and authentication keys to be used.

Conventionally, static groups created on a key server persist indefinitely or until they are explicitly cleared on the key server through configuration. This static group approach is not efficient for a range of on-demand applications, and GDOI and other group keying protocols are not equipped to expire or delete groups after a given period of time or to stop the rekeying process in which keys are periodically updated. In the described system, key server 10 is capable of dynamically create and delete (destroy) groups as needed to conduct time-limited secure group communication sessions, thereby expanding the scope of key-server-based, group-keying technologies such as GETVPN and making them usable by a wide variety of on-demand applications. Dynamic group creation on the key server reduces the rekey and group formation overhead and makes the overall process more efficient.

Figure 2:
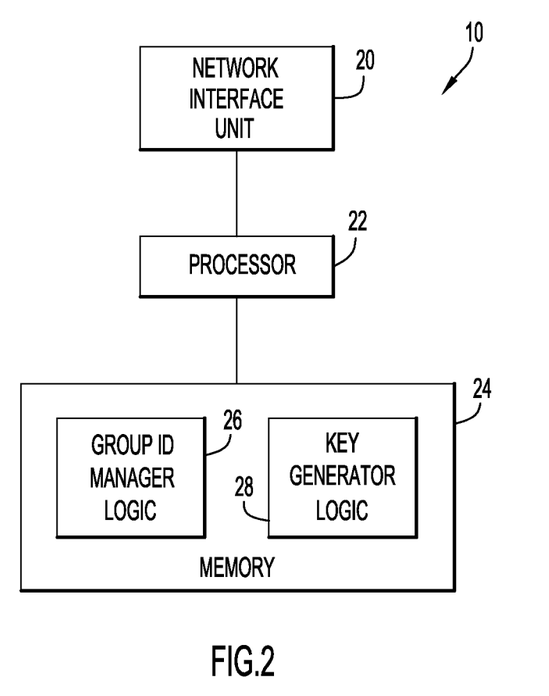
FIG. 2 is a block diagram illustrating an example of a key server capable of dynamically creating and deleting groups to support secure group communication sessions.

Turning now to FIG. 2, a block diagram illustrating an example of key server 10 configured to dynamically create groups is shown. Key server 10 can be implemented using one or more network routers; however other devices may also be configured to perform the key server functions described herein. Key server 10 can also be a pure computational element and not configured to forward packets in the network. Generally, key server 10 comprises at least a network interface unit 20, a processor 22, and a memory 24. Processor 22 is, for example, a microprocessor, a microcontroller, a digital signal processor, etc. Network interface unit 20 is a device, e.g., Ethernet card or module, configured to enable communications over a network according to any of a variety of networking protocols.

Memory 24 is a tangible processor-readable or computer-readable memory that stores or is encoded with instructions that, when executed by processor 22, cause processor 22 to perform the functions described herein. For example, memory 24 is encoded with group ID manager logic 26 and key generator logic 28. While FIG. 2 shows a processing environment comprising a data processor 22 that executes software stored in memory 24, an alternative processing environment is a fixed data processing element, such as an application specific integrated circuit (ASIC) that is configured, through fixed hardware logic, to perform the functions of the logic 26 and 28. Yet another possible data processing environment is one involving one or more field programmable logic devices, or a combination of fixed processing elements and programmable logic devices. In one form, logic 26 and 28 may be embodied in a processor-readable medium that is encoded with instructions for execution by a processor that, when executed by the processor, operate to cause the processor to perform the functions described herein in connection with logic 26 and 28.

Figure 3:
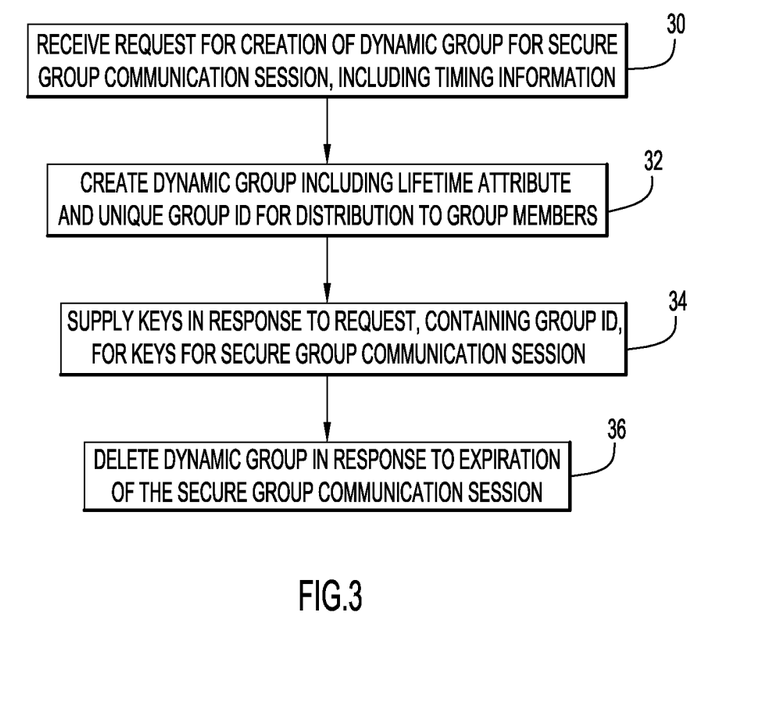
FIG. 3 is a flow diagram illustrating an example of operations performed by a key server to facilitate a secure group communication session.

FIG. 3 is a flow chart illustrating operations performed by key server 10, in particular by processing group ID manager logic 26 and key generator logic 28, to dynamically create and delete a group and manage implementation of a secure group communication session between group members 12 and 14 shown in FIG. 1. In operation 30, key server 10 receives a request from host 12 for creation of a dynamic group in order to conduct a secure group communication session. The group-creation request can be implemented as a sequence of exchanges between host 12 and key server 10.

In particular, a secure connection can be established between host 12 and key server 10 using a key exchange protocol such as IKEv1, IKEv2, or other key exchange protocol. IKE phase 1 can be used to establish a secure connection with key server 10 and to authenticate the group members. Instead of passing an existing group ID to key server 10 at this initial registration time, host 12 supplies to key server 10 information for creating a dynamic group. Key server 10 receives this information and, if capable of creating dynamic groups, key server 10 acknowledges the request. In response, host 12 further supplies to key server 10 timing information about when the session is to occur and other information that is applicable for the session (e.g., policies, default/specific transform-set, etc.). IKE phase 2 can be used to exchange the meeting details, for example. The timing information can be specified in any of a variety ways. According to one option, the timing information can indicate a starting date and time and an ending date and time for the session. According to another option, the timing information can indicate a starting date and time and a duration of the session (from which an ending date and time can be determined).

With a conventional, static group, an entity contacting the key server at this point is already a member of an established, static group, so there is no need to supply a group ID to the group member. Thus, the key server supplies the keys in response to a request from a group member. With dynamic group creation, the keys are not immediately supplied to the group member. Rather, the dynamic group ID is supplied at this point, and keys are supplied at a later time upon request by the group member, e.g., at the time the group member wishes to join the secure group communication session.

Referring again to FIG. 3, in operation 32, processor 22 processes group ID manager logic 26 to create a dynamic group based on the information received from host 12. In particular, based on the timing information provided in the request, group ID manager logic 26 generates a lifetime attribute of the dynamic group that indicates when the dynamic group is to exist. The starting time and expiration time of the dynamic group indicated by the lifetime attribute essentially correspond to the starting and expiration time of the secure group communication session to be held among the group members. The lifetime attribute is associated with the dynamic group and is stored in memory 24 of key server 10 for later determining when to delete the dynamic group. As with the timing information, the lifetime attribute can be specified in a number of different ways (e.g., start and end times, start time and duration, etc.).

Group ID manager logic 26 also generates a unique group ID that identifies the dynamic group for the upcoming secure group communication session. Key server 10 then supplies the unique group ID to the group members. In the example shown in FIG. 1, this can be accomplished by sending the group ID to host 12 and having host 12 disseminate the group ID to the other group members. Another option is to have key server 10 directly send the group ID to each of the group members, including host 12.

To participate in the secure group communication session, each group member can register with key server 10 (e.g., via GDOI registration) by sending a request that identifies the group by the unique group ID previously disseminated. In operation 34, processor 22 executes key generator logic 28 to generate and supply the cryptographic keys in response to such a request, e.g., using the GDOI protocol. Security policies can also be sent along with the keys. According to another option, host 12 may register with key server 10 using the unique group ID and request the keys for all of the group members. In this case, key server 10 supplies the keys (and, optionally, security polices) to host 12, which can then distribute the keys to the remaining group members. In either case, dissemination of keys to an individual group member does not need to occur until the member wishes to join the group session. Once the group members have been authenticated and have received the keys, the group members can use these keys to secure (encrypt) the traffic (e.g., multicast/unicast data) that is sent during the session. Note that key server 10 does not encrypt the traffic within the secure group communication session in the embodiment shown in FIG. 1.

Referring once again to FIG. 3, in operation 36, processor 22 executes group ID manager logic 26 to delete the dynamic group in response to expiration of the secure group communication session, as indicated by the stored lifetime attribute of the dynamic group. According to one option, when the session expires according to the stored lifetime attribute, key server 10 sends a delete or expiration notification to all of the group members or sends a delete/expiration notification to host 12, which disseminates the delete/expiration notification to the other group members. The notification informs the group members that the session is expiring and that key server 10 is deleting the dynamic group. The delete notification can be enforced by host 12 and the other participants by terminating the session and/or by locally deleting the keys. Optionally, before sending the delete notification, key server 10 can send an inquiry to host 12 asking whether there is a need to extend the meeting. In this case, key server 10 can await a response from host 12 prior to sending the delete notification.

Thus, the dynamic group creation technique described herein allows groups to be dynamically created on a key server as needed, such as in response to the scheduling of a new WebEx meeting or a pay-per-view event. Once the dynamic group is created on the key server, it has a lifetime attribute which indicates to the key server when this group is no longer valid and should be deleted. On the group member side, the keys will expire when the lifetime period is over, and the group states are cleared.

Optionally, in the event the host or one of the other participant group members wishes to extend the session, an extension request can be sent to key server 10. In response to such an extension request, group ID manager logic 26 can modify the lifetime attribute of the dynamic group in accordance with the extension request to modify the expiration time of the dynamic group and the secure group communication session, confirm extension of the session with host 12 (or all group members), and supply new keys and any change in policies via rekeying if necessary.

When using a group keying protocol such as GDOI, a rekeying mechanism is employed to refresh the keys by providing new or updated keys to the group members at certain points in time specified in the security policies (e.g., periodically, as-needed, etc.). This GDOI rekey property can be retained in the dynamic group creation scheme described herein, such that rekeying can occur, as desired, during the secure group communication session (e.g., keys can be refreshed every half-hour in an hour-long session). Note that it is not necessary to rekey if a group member joins or leaves the session.

Figure 4:
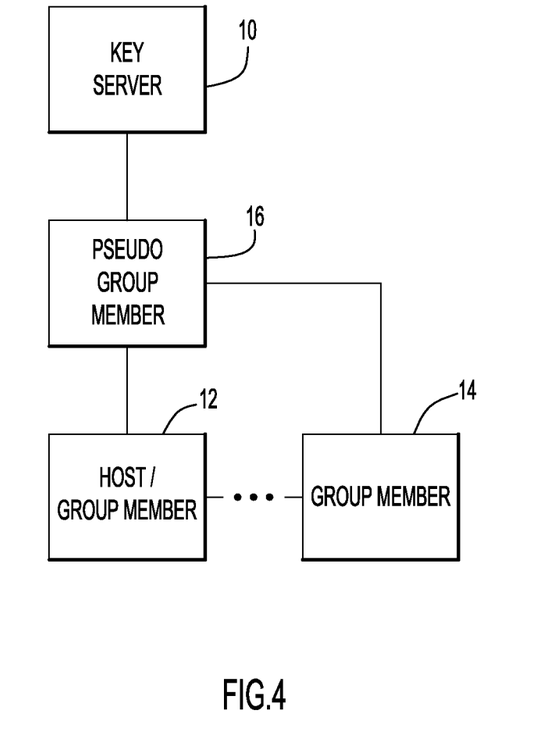
FIG. 4 is a block diagram illustrating an example of a communication network in which a key server, accessed via a pseudo group member, is configured to generate a dynamic group to support a secure group communication session among group members.

In some applications, such as certain on-demand applications, a server or other network device may function to coordinate or facilitate a session among group members. For example, a WebEx server may be used to manage a WebEx meeting among a host and other participants. In this case, the coordinating network device can serve as a proxy or intermediary for the group members and handle exchanges with the key server. In this sense, the intervening network device operates as a "pseudo group member" (or "pseudo GM"), since, from the key server's perspective, the network device assumes the role of a group member, but is a facilitator or coordinator of the group session rather than a participant. FIG. 4 is a block diagram illustrating a network environment where a pseudo GM 16 resides between key server 10 and group members 12 and 14. Pseudo GM 16 can be in a physically separate location or at a different site and can be connected via a WAN or the like to group members 12 and 14 and key server 10.

Figure 5:
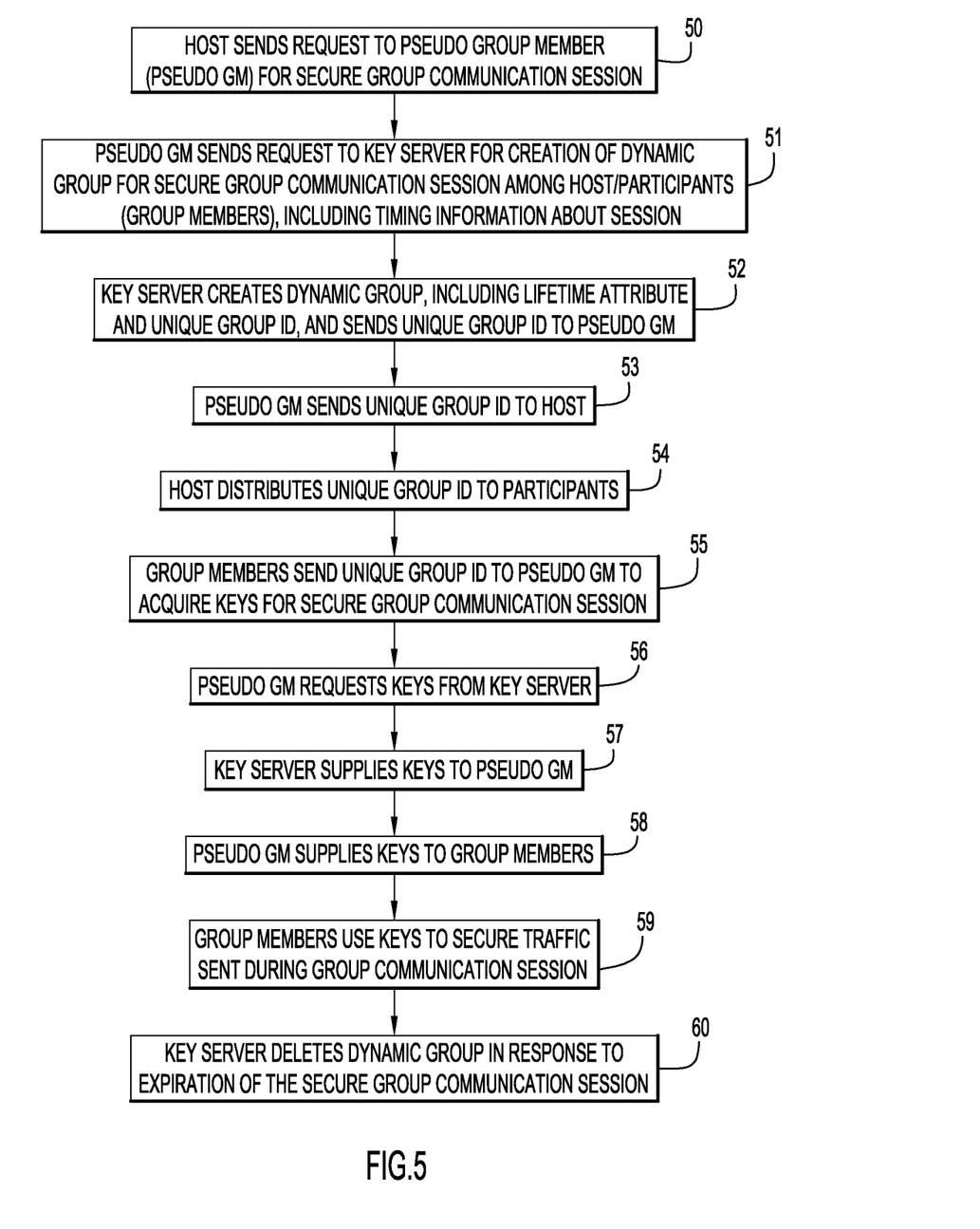
FIG. 5 is a flow diagram illustrating an example of a sequence of exchanges for managing a secure group communication session employing a pseudo group member.

Turning to FIG. 5, a flow diagram illustrating a sequence of exchanges for managing a secure group communication session by employing a pseudo group member is shown. Many operations described in connection with FIG. 5 are performed by execution of the group ID manager logic 26 and key generator logic 28 (FIG. 2). In operation 50, host 12 sends a request to pseudo GM 16 to authenticate with pseudo GM 16 and to set up a secure group communication session, such as a WebEx meeting for example. After authenticating host 12, in operation 51, pseudo GM 16 sends a request to key server 10 on behalf of host 12 for creation of a dynamic group for the secure group communication session among the group members. This request can be similar to the request made directly by host 12 in the previous example described in connection with FIGS. 1-3. Thus, for example, pseudo GM 16 registers with key server 10, establishes a secure link, and supplies timing information about the upcoming group communication session to key server 10.

In operation 52, key server 10 creates a dynamic group based on the information received from pseudo GM 16, e.g., by processing group ID manager logic 26 (FIG. 2). In particular, based on the timing information provided in the request, key server 10 generates the lifetime attribute of the dynamic group based on the timing information, as previously described. Key server 10 also generates the unique group ID that identifies the dynamic group for the upcoming secure group communication session. Key server 10 then supplies the unique group ID to pseudo GM 16 for distribution to the group members. In operation 53, pseudo GM 16 sends the group ID to host 12 which, in operation 54, distributes the group ID to the remaining group member(s) 14. According to another option, pseudo GM 16 can directly send the group ID to each of the group members, including host 12.

To participate in the secure group communication session, each group member can register with key server 10 (e.g., via GDOI registration) by sending a request that identifies the group by the unique group ID previously disseminated. In the arrangement shown in FIG. 4, the group members authenticate with and send the key request to pseudo GM 16 (operation 55), which in turn registers with key server 10 and requests the keys on behalf of the group members (operation 56). According to another option, host 12 can send a key request to pseudo GM 16 on behalf of the remaining group members instead of all group members sending key requests to pseudo GM 16. In either case, pseudo GM 16 sends the request for keys to key server 10. By executing key generator logic 28, in operation 57, key server 10 generates and supplies the cryptographic keys to pseudo GM 16 in response to such a request, e.g., using the GDOI protocol or other group keying protocol. Security policies can also be sent along with the keys.

In operation 58, pseudo GM 16 supplies the keys (and, optionally, security policies) to the group members. According to another option, pseudo GM 16 can supply the keys to host 12, which can then distribute the keys to the remaining group members. In either case, dissemination of keys to an individual group member does not need to occur until the member wishes to join the group session. Once the group members have been authenticated and have received the keys, the group members can use these keys to secure the traffic that is sent during the session (operation 59).

In operation 60, key server 10, via group ID manager logic 26, deletes the dynamic group in response to expiration of the secure group communication session, as indicated by the stored lifetime attribute of the dynamic group. Key server 10 can send a delete or expiration notification to pseudo GM 16 to inform the group members that the session is expiring and that key server 10 is deleting the dynamic group. If the host or one of the other participant group members wishes to extend the session, an extension request can be sent to key server 10 via pseudo GM 16 to extend the session. Key server 10 can modify the lifetime attribute of the dynamic group in accordance with the extension request to modify the expiration time of the dynamic group and the secure group communication session, confirm extension of the session with pseudo GM 16, and supply new keys and any change in policies via rekeying, if necessary, to pseudo GM 16 for dissemination to the group members.

The dynamic group creation technique described herein avoids the need for on-demand applications to have their own versions of encryption and allows group keying protocol based systems such as GETVPN to be the encryption backbone of such applications. This approach provides a more standardized encryption mechanism that can simplify implementation of current and future on-demand applications, potentially avoiding costly network, hardware, and software modifications. Systems such as GETVPN provide layer 3 (network layer) encryption. By expanding GETVPN and other group keying protocol based systems to provide dynamic group creation, applications can easily leverage these systems to encrypt their data. Consequently, such systems can provide a unified back end to these applications and simplify the use of various security schemes. Creating the groups dynamically eliminates the need to statically configure all the groups in advance, and gives the key server the flexibility to create the groups as requests are received. In addition, there is less overhead in maintaining the groups when they are no longer needed. This adds efficiency and greater flexibility to the key server deployment.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method performed at a key server comprising:
receiving a request for creation of a dynamic group that enables group members to participate in a secure group communication session, wherein the request includes timing information indicating when the dynamic group is to exist;
creating the dynamic group, including:
generating a lifetime attribute of the dynamic group based on the received timing information, wherein the lifetime attribute indicates the time period of when the dynamic group is to exist, and
generating a unique group identifier (ID) associated with the dynamic group for distribution to the group members;
supplying keys for the secure group communication session in response to one or more requests containing the unique group ID identifying the dynamic group for use by the group members to encrypt and decrypt traffic that is sent during the secure group communication session; and
deleting the dynamic group in response to determining from the lifetime attribute that the secure group communication session has expired.

2. The method of claim 1, wherein supplying the keys includes supplying the keys to at least one group member configured to run an on-demand application to implement the secure group communication session.

3. The method of claim 1, wherein supplying the keys includes supplying the keys to a pseudo group member configured to run an on-demand application to implement the secure group communication session among the group members.

4. The method of claim 1, further comprising:
receiving an extension request to extend a period of the secure group communication session; and
adjusting the lifetime attribute of the dynamic group in accordance with the extension request to modify an expiration time of the secure group communication session.

5. The method of claim 1, further comprising:
generating a delete notification for distribution to the group members in response to deleting the dynamic group.

6. The method of claim 1, wherein a group keying protocol is used to supply the keys.

7. The method of claim 1, wherein the lifetime attribute of the dynamic group specifies a start time and either a duration or an expiration time associated with the secure group communication session.

8. The method of claim 1, further comprising:
rekeying the dynamic group by generating new keys for distribution to the group members during the secure group communication session.

9. An apparatus comprising:
a network interface unit configured to communicate messages over a network;
a processor configured to be coupled to the network interface unit, wherein the processor is configured to:
receive a request for creation of a dynamic group that enables group members to participate in a secure group communication session, wherein the request includes timing information indicating when the dynamic group is to exist;
create the dynamic group, including:
generate a lifetime attribute of the dynamic group indicating the time period of when the dynamic group is to exist, and
generate a unique group identifier (ID) associated with the dynamic group for distribution to the group members;

supply keys for the secure group communication session in response to one or more requests containing the unique group ID identifying the dynamic group for use by the group members to encrypt and decrypt traffic that is sent during the secure group communication session; and delete the dynamic group in response to determining from the lifetime attribute that the secure group communication session has expired.

10. The apparatus of claim 9, wherein the processor is configured to supply the keys to at least one group member configured to run an on-demand application to implement the secure group communication session.

11. The apparatus of claim 9, wherein the processor is configured to supply the keys to a pseudo group member configured to run an on-demand application to implement the secure group communication session among the group members.

12. The apparatus of claim 9, wherein the processor is further configured to:

receive an extension request to extend a period of the secure group communication session; and adjust the lifetime attribute of the dynamic group in accordance with the extension request to modify an expiration time of the secure group communication session.

13. The apparatus of claim 9, wherein the processor is further configured to:

generate a delete notification for distribution to the group members in response to deleting the dynamic group.

14. The apparatus of claim 9, wherein the processor is configured to supply the keys using a group keying protocol.

15. A non-transitory processor readable medium storing instructions that, when executed by a processor at a key server, cause the processor to:

receive a request for creation of a dynamic group that enables group members to participate in a secure group communication session, wherein the request includes timing information indicating when the dynamic group is to exist;

create the dynamic group, including:

generate a lifetime attribute of the dynamic group indicating the time period of when the dynamic group is to exist, and generate a unique group identifier (ID) associated with the dynamic group for distribution to the group members;

supply keys for the secure group communication session in response to one or more requests containing the unique group ID identifying the dynamic group for use by the group members to encrypt and decrypt traffic that is sent during the secure group communication session; and delete the dynamic group in response to determining from the lifetime attribute that the secure group communication session has expired.

16. The non-transitory processor readable medium of claim 15, wherein the instructions that cause the processor to supply the keys comprise instructions that cause the processor to supply the keys to at least one group member configured to run an on-demand application to implement the secure group communication session.

17. The non-transitory processor readable medium of claim 15, wherein the instructions that cause the processor to supply the keys comprise instructions that cause the processor to supply the keys to a pseudo group member configured to run an on-demand application to implement the secure group communication session among the group members.

18. The non-transitory processor readable medium of claim 15, further storing instructions that, when executed by the processor, further cause the processor to:

receive an extension request to extend a period of the secure group communication session; and adjust the lifetime attribute of the dynamic group in accordance with the extension request to modify an expiration time of the secure group communication session.

19. The non-transitory processor readable medium of claim 15, further storing instructions that, when executed by the processor, further cause the processor to:

generate a delete notification for distribution to the group members in response to deleting the dynamic group.

20. The non-transitory processor readable medium of claim 15, wherein the instructions that cause the processor to supply the keys comprise instructions that cause the processor to supply the keys using a group keying protocol.

* * * * *

UNITED STATES PATENT AND TRADEMARK OFFICE
CERTIFICATE OF CORRECTION

PATENT NO. : 8,750,507 B2
APPLICATION NO. : 12/692812
DATED : June 10, 2014
INVENTOR(S) : Tanya Roosta, Kavitha Kamarthy and Dinesh Ranjit Page 1 of 1

It is certified that error appears in the above-identified patent and that said Letters Patent is hereby corrected as shown below:

In the Claims

Claim 1, column 8, line 2, insert the phrase --a time period of-- between the words "indicating" and "when".

Claim 9, column 8, line 58, insert the phrase --a time period of-- between the words "indicating" and "when".

Claim 15, column 9, line 38, insert the phrase --a time period of-- between the words "indicating" and "when".

Signed and Sealed this
Twelfth Day of August, 2014

Michelle K. Lee
*Deputy Director of the United States Patent and Trademark Office*